J. LIPS.
MACHINE FOR FILING SAWS.
APPLICATION FILED JULY 15, 1918.

1,409,384.

Patented Mar. 14, 1922.
3 SHEETS—SHEET 1.

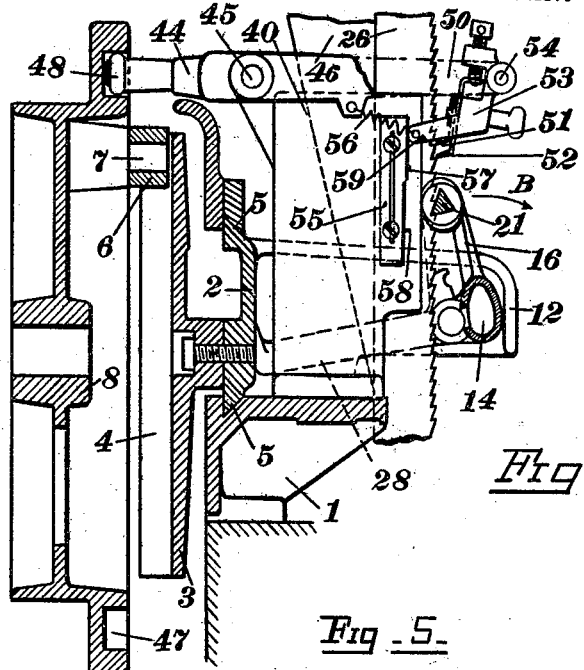
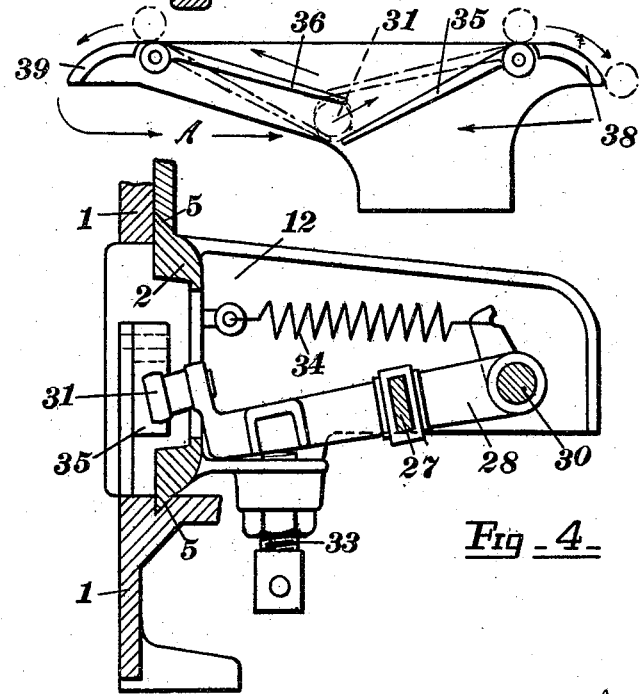

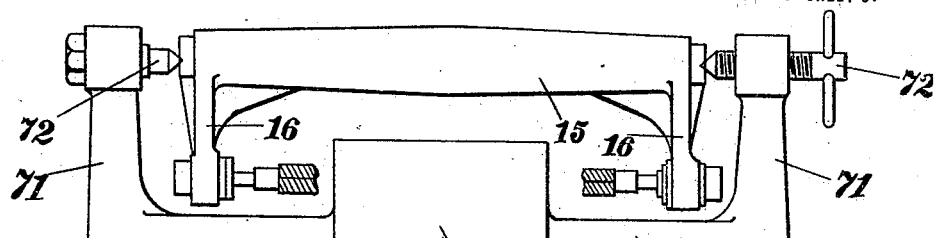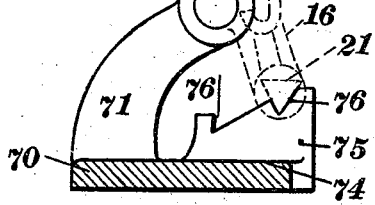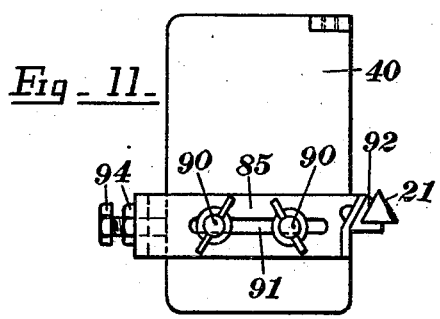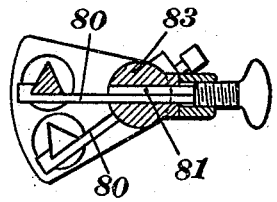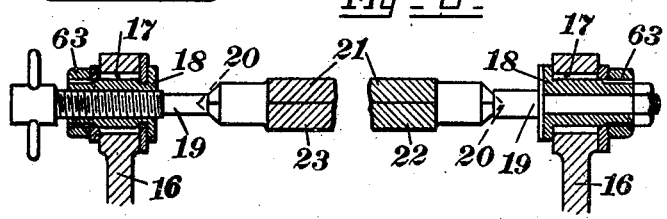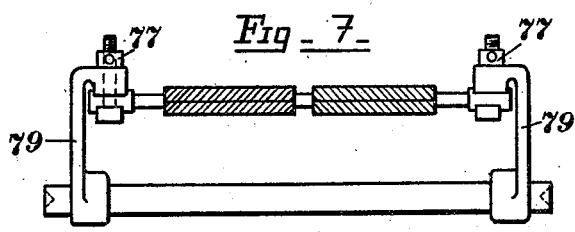

UNITED STATES PATENT OFFICE.

JACOB LIPS, OF NIEDER-URDORF, SWITZERLAND.

MACHINE FOR FILING SAWS.

1,409,384.  Specification of Letters Patent.  Patented Mar. 14, 1922.

Application filed July 15, 1918. Serial No. 244,954.

*To all whom it may concern:*

Be it known that I, JACOB LIPS, manufacturer, a citizen of the Swiss Confederation, residing at Nieder-Urdorf, Canton Zurich, Switzerland, have invented new and useful Improvements in Machines for Filing Saws, of which the following is a specification.

My invention has relation to machines for filing saws, band saws and so on in which one or more files are movably mounted on a reciprocated slide or carriage their movement being controlled by a steering device in such a manner that the different files or the different faces of one file alternate in their operation, one file or one face of a file cutting a saw tooth in one direction and another file or face of a file cutting the next following tooth in the opposite direction, thus filing the saw from alternate sides.

One object of the invention is to provide means to facilitate the mounting of the file or the files in the carriage in such a manner that the working faces of the file or the files may be placed in their true working position even by an unskilled person without loss of time etc. the files being automatically set in such a manner that their working faces run exactly parallel to the path of the reciprocating carriage, therefore working with their full length and moreover in the proper position to the saw to be sharpened, in such a manner that the shape of the teeth is not altered.

I attain this object by making use of adjusting devices, of gauges or the like and by providing holders and fastening means for the files to adjust and fix the file or files in their true position on the carrier so that the working faces remain in engagement with the saw during the full working stroke.

To simplify the machine and the handling thereof I arrange on one and the same file of triangular cross-section on each side of the file two cutting or working faces and move the file suchwise that the faces on one side work on two consecutive teeth of the saw in alternate direction according to the setting of the teeth.

It is obvious that by employing only one file the adjustment is simplified and accurate work insured.

Other objects of the invention relate to the provision of minor parts co-operating with the elements above noted and to details of construction all of which will be more clearly set forth in the following specification.

With the above objects in view the invention resides in the parts and combinations of parts hereinafter described and particularly set forth in the claims appended hereto.

In the accompanying drawings a saw-filing-machine is shown by way of an example:

Figure 1:
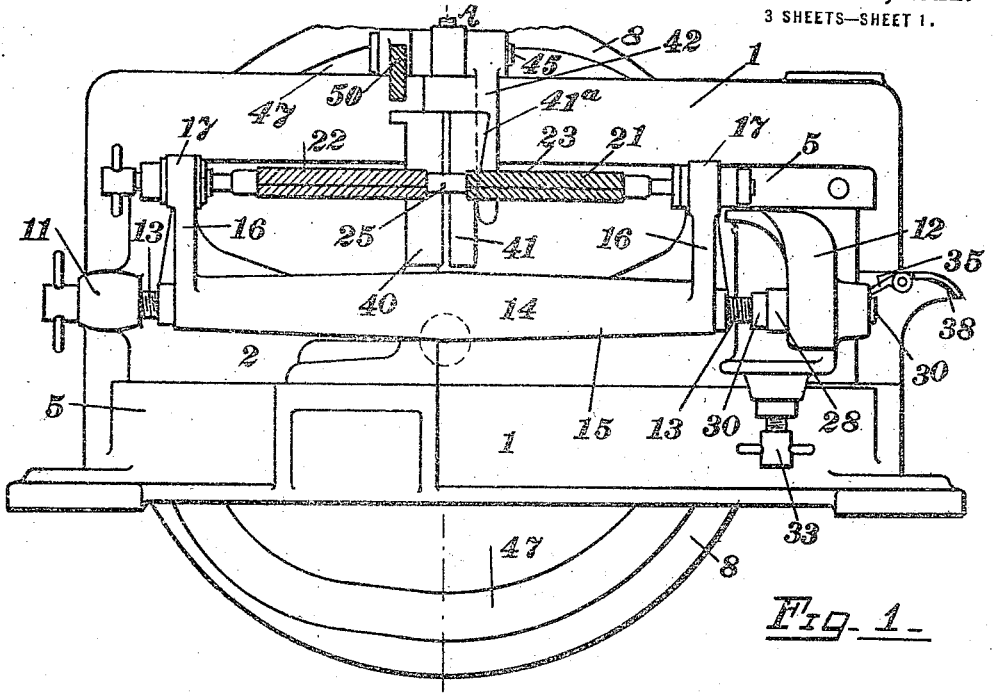
Fig. 1 is a front view of the machine.
Figure 2:
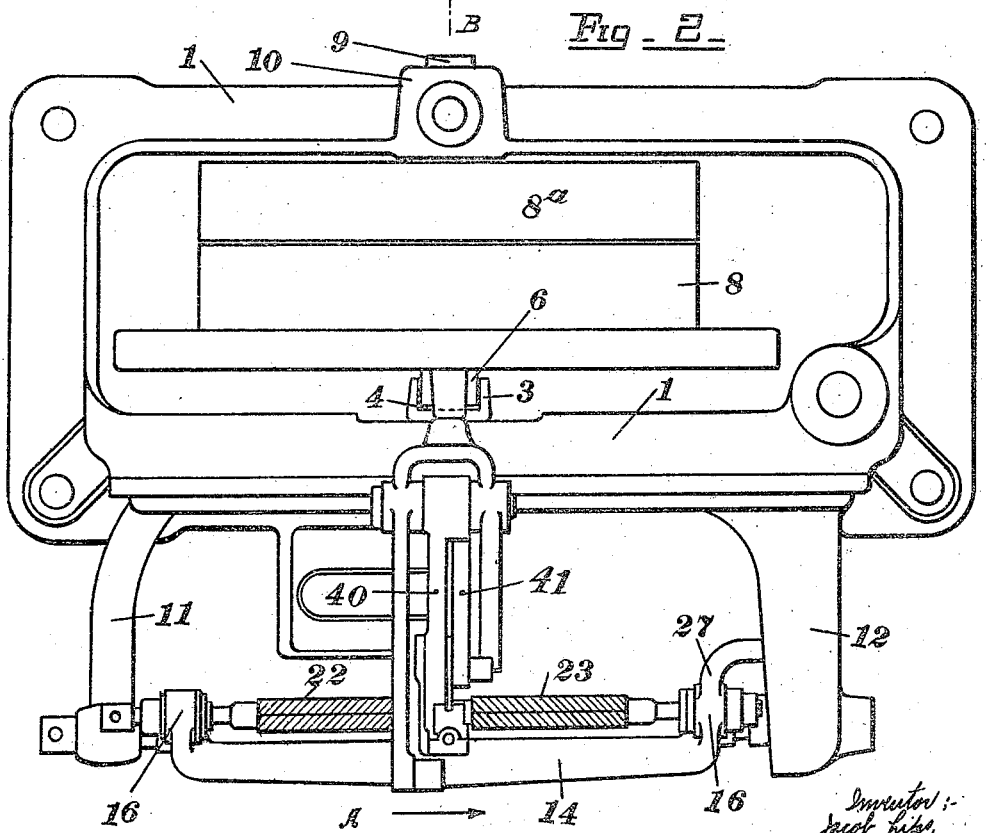
Fig. 2 is a top view.

Fig. 3 a sectional side elevation on line A—B of Fig. 1.

Fig. 4 is a similar view of the same, on a plane disclosing the lever 28 and its connections.

Fig. 5 is a detail elevation, showing the pivoted tongues 35—36 which automatically operate said lever.

Fig. 6 is a detail sectional view of the file and the arms of the file carrier and the means for mounting and adjusting the file.

Fig. 7 is a detail elevation, and

Fig. 8 is a detail sectional view of a file adjusting device for use in connection with my improved saw filing machine.

Fig. 9 is an elevation, and

Fig. 10 is a vertical sectional view of a device for use in placing the file in the machine.

Fig. 11 is an elevation of a gauge for use in adjusting the file.

Fig. 12 is a detail sectional view of another form of gauge for adjusting the file.

The machine shown in the drawing comprises a frame 1 having guide ways 5 in which a slide or carriage 2 is arranged. To the slide 2 a cross-head 3 is fastened having a straight groove 4 running at a right angle to the guide ways 5. A roller 6 projects into the groove 4 which roller is mounted on a bolt 7 eccentrically arranged on a pulley 8. The pulley 8 runs loosely on a shaft 9 mounted in a bearing 10 of the frame 1. Beside the pulley 8 an idle pulley 8ᵃ is arranged. The pulley 8 when rotated moves the slide 2 to and fro in the guide ways 5. On the slide 2 there are arranged two arms 11, 12 carrying between the points of two screws 13 a file-carrier 14. The carrier 14 consists of a body part 15 having two arms 16 projecting upwards. Each arm 16 is provided with an elongated eye 17 and in each eye 17 a sleeve 18 is adjustably mounted. Each sleeve 18 holds a bolt 19 the one end of which is provided with a recess 20 in which one end of a file 21 is seated. The file 21 has a triangular cross-section. On each side of the file there are two working faces 22, 23 between which there is a blank 25. The teeth of the respective faces 22, 23 are cut in different angles and are arranged in reverse relation so that one face works in the one direction of the working stroke of the slide 2 and the other face in the opposite direction. To bring the file in and out of engagement with the saw 26 I provide on the body part 15 an arm 27 the free end of which rests on a lever 28 having its fulcrum on the pivot 30. The lever 28 extends outwardly through a large opening in the slide 2 and is provided at its free end with a roller 31. The lever 28 being on the slide 2 follows the reciprocating movements of the same and is moreover moved up and down bringing thereby the working faces of the file 21 in and out of engagement with the saw. The lever 28 when depressed, rests on a set screw 33 during the working stroke of the file and is held thereon by means of a spring 34. To swing the lever 28 upwards in order to bring the file out of the saw I provide two movable tongues 35, 36 projecting into the path of the roller 31. The tongues 35, 36 are inclined in opposite directions. If the slide has finished half of the entire working stroke and after the face 22 has sharpened a tooth say in the direction of the arrow A Fig. 5 the roller 31 strikes against the tongue 35 and travels upwardly thereon and hence the lever 28 is forced upwardly swinging thereby the carrier 14 as indicated by the arrow B (Fig. 3) the file 21 coming thereby out of the teeth of the saw 26. During the rest of the stroke of the slide 2 the file 21 is kept out of engagement with the saw because, the roller 31 after passing over the tongue 35 moves over a fixed guide 38 arranged adjacent to the upper pivoted end of the tongue 35. During this part of the movement of the slide 2 the saw is shifted for one tooth. As soon as the slide 2 reaches the end position and approximately coinciding with the reversal in the direction of the slide 2 the roller 31 glides off the guide 38. The spring 34 returns the lever 28 to its position on the screw 33 and the face 23 of the file 21 is brought in its working position. If the slide starts for the return stroke the file 21 enters the saw 26 and the face 23 works on a tooth of the saw. Half way on the return stroke of the slide 2 the roller 31 meets the tongue 36 and is thereby lifted. The carrier 14 is again swung out and the file 21 leaves the saw which is shifted as described later on whilst the slide finishes its return stroke. The roller 31 runs over the guide 39 arranged at the upper end of the tongue 36 and falls behind the lug 39 down to the set-screw 33. The file 21 is again in its working position and after reversal of the slide movement the face 22 enters the saw 26 and sharpens a tooth.

To hold the saw 26 in position I provide a vise consisting of a plate 40 firmly attached to the frame 1 and a second plate 41 which is movably mounted on the first named plate 40. The saw is slidably arranged between the plates 40—41. Plate 41 stands under the action of a spring 43 which tends to move the plates 40, 41 apart. On plate 41 acts moreover one arm 42 of a bifurcated lever 44 which is journalled at 45 on the plate 40. The arm 42 when moving upwards runs over an inclined plane 41$^a$ on plate 41 pressing thereby the latter against the plate 40 and clamping the saw 26 firmly. Between the plates 40, 41 I arrange a wedge 46 (see Fig. 3) which forms an adjustable abutment for the saw 26. Said wedge bears at one edge against the back of the saw and at the opposite edge bears against the shoulder on the plate 40. To swing the lever 44 I provide an endless cam groove 47 on the face of the pulley 8 in which runs a roller 48 mounted on lever 44. On each rotation of pulley 8 its cam groove 47 and the roller 48 cause the lever 44 to make two strokes and to hence open and close the vise twice. The second arm 50 of the lever 44 carries the pawls 51, 52 arranged to shift the saw 26 twice for one tooth during one rotation of the pulley 8. The pawls 51, 52 are adjustably mounted in a bracket 53 journalled at 54 to the arm 50 and held by a spring 56 (see Fig. 3.) The distance between the ends of the pawls 51, 52 corresponds to the pitch of the teeth of the saw, this arrangement being made to ensure the shifting of the saw even when one tooth is broken. The lower end of the bracket 53 is provided with an extension 59 which is kept in engagement with an adjustable abutment 55 by means of a spring 56. The abutment 55 is provided with two guide planes 57, 58 connected by an inclined plane. When the lever 44 swings on its pivot the bracket 53 moves up and down making a stroke of predetermined length. The pawls 51, 52 take part on this movement but they are kept out of engagement with the saw 26 as long as the extension 59 slides on the plane 57. As soon as the extension 59 passes from plane 57 to plane 58 the ends of the pawls 51, 52 enter between the teeth and shift the saw during the remaining part of the stroke. By adjusting the abutment in vertical direction more or less of the stroke of lever 44 may be used for shifting the saw 26 according to the pitch. The file is provided at its ends and in the middle with recesses which when opposite the saw 26 allow the insertion of the file in the interspaces between the teeth.

To mount the file 21 in the carrier 14 in such a manner that the working faces work in their full length I arrange sleeves 18 in slots 17 of the arms 16 of the carrier. The sleeves 18 may be rigidly fixed to the arms by means of thumb nuts 63 clamping the sleeves firmly on the arms. Within each sleeve there is a pin or bolt for holding the ends of the file 21. To place the working faces of the file in a true parallel direction to the path of the slide 2 I arrange some auxiliary device to enable even unskilled persons to place the file in its true position without much loss of time. One device is shown by way of an example in Figs. 9 and 10. This device consists of a bracket 70 having two arms 71 and in each arm a set screw 72. The bracket is adapted to receive the file carrier 14 which may be inserted between the set screws 72. On the base plate 74 of the bracket 70 a gauge block 75 is arranged having a groove 76 adapted to receive the file 21 which file fits exactly in said groove. The groove 76 runs parallel to the axis through the screws 72 and the sides of the groove have the proper position with regard to the said axis so that when a file is placed in the groove and fastened in this position to the file carrier by means of the adjustable sleeves it will have the proper working position with respect to the saw to be sharpened, the flanks of the file having the proper angular position so that the teeth of the saw receive the proper shape desired.

To adjust the file in its true working position other devices may be used. The file may be placed in notches 78 provided in the arms 79 of the file carrier as shown in Figs. 7 and 8. To hold the file I provide clamping screws 77 which press the file into the notches 78 the sides of which enclose the same angle as the flanks of the file. The file is held firmly and cannot be displaced during the work.

Other means for adjusting the file in its working position on the file carrier may be used for instance loose gauges 80 which may be inserted in holes 81 of the carrier 83. The gauges 80 are readily removed as soon as the adjustment has taken place. One hole 81 is provided near each end of the file.

As shown in Fig. 11 the gauges may be fixed to the frame 1. In this case the gauge consists of an adjustable plate 85 which is fastened to the plate 40 by means of screws 90 reaching through a slot 91. The front end of plate 85 is provided with a groove 92 adapted to receive the file, the sides of the groove enclosing an angle of 60°. The plate 85 may be adjusted by means of a screw 94. To adjust the file the carrier is moved so that each end of the file may be inserted in the plate 85 and then fixed.

While I prefer to use in connection with my device the file previously described it may in some instances be found advantageous to use two files arranged either in line and with the working faces in one plane or arranged parallel to each other and to the path of the slide 2 in a common file carrier 14 in different arms thereof as shown in Fig. 10. The files are brought alternately in engagement with the saw, two consecutive teeth of the saw being filed in opposite direction; the files are moved in and out of their working position during the reversal of the slide-stroke by substantially the same means as described with reference to Fig. 1. To adjust the two files on the file carrier the same devices may be used as described above, the files which are arranged on separate arms and in separate sleeves being adjusted one after the other by means of two slots arranged in the bracket as shown in Fig. 10.

Having thus described my invention what I claim and desire to secure by Letters Patent of the United States is:—

1. In a saw-filing machine, the combination with a frame provided with guideways, an automatically-operating vise adapted to grip the saw, a reciprocating file carriage, a file carrier journaled therein, a file of triangular cross-section having two working faces on each side, adjustably mounted in said carrier, a device to tilt said file carrier at the ends and in the middle of the stroke of said carriage whereby the working faces of the file are alternately brought in or out of their working position, means to feed the saw and means to adjust the file in the file carrier.

2. In a saw-filing machine, the combination with a frame provided with guideways, an automatically-operating vise adapted to grip the saw, a reciprocating file carriage, a file carrier journalled therein, a file of triangular cross-section having two working faces on each side adjustably mounted in said carrier, a tilting lever connected with said file carrier, two movable inclined tongues on the frame reaching in the path of said tilting lever adapted to swing the file carrier at the ends and in the middle of the stroke of the carriage to bring the file in or out of its working position, means to feed the saw and means to adjust the file in the file carrier.

3. In a saw-filing machine, the combination with a frame provided with guideways, an automatically-operating vise adapted to grip the saw, a reciprocating file carriage, a file carrier journalled therein, and carrying a file, a device to tilt said file carrier whereby the file or the files are brought in or out of engagement with the teeth, a double-armed lever, means to rock said lever, an arm on said lever, a bracket journalled on said lever, two pawls adjustably mounted in said bracket, a projecting arm on said bracket, an adjustable guide for said arm, a spring holding said arm in engagement with the guide, said guide being adapted to bring the pawls in or out of the teeth and means to facilitate the adjustment of the file on said file carrier.

In testimony whereof I affix my signature.

JACOB LIPS.